May 9, 1939.  S. REPASY  2,157,346
LAWN AND GARDEN TOOL
Filed March 29, 1938
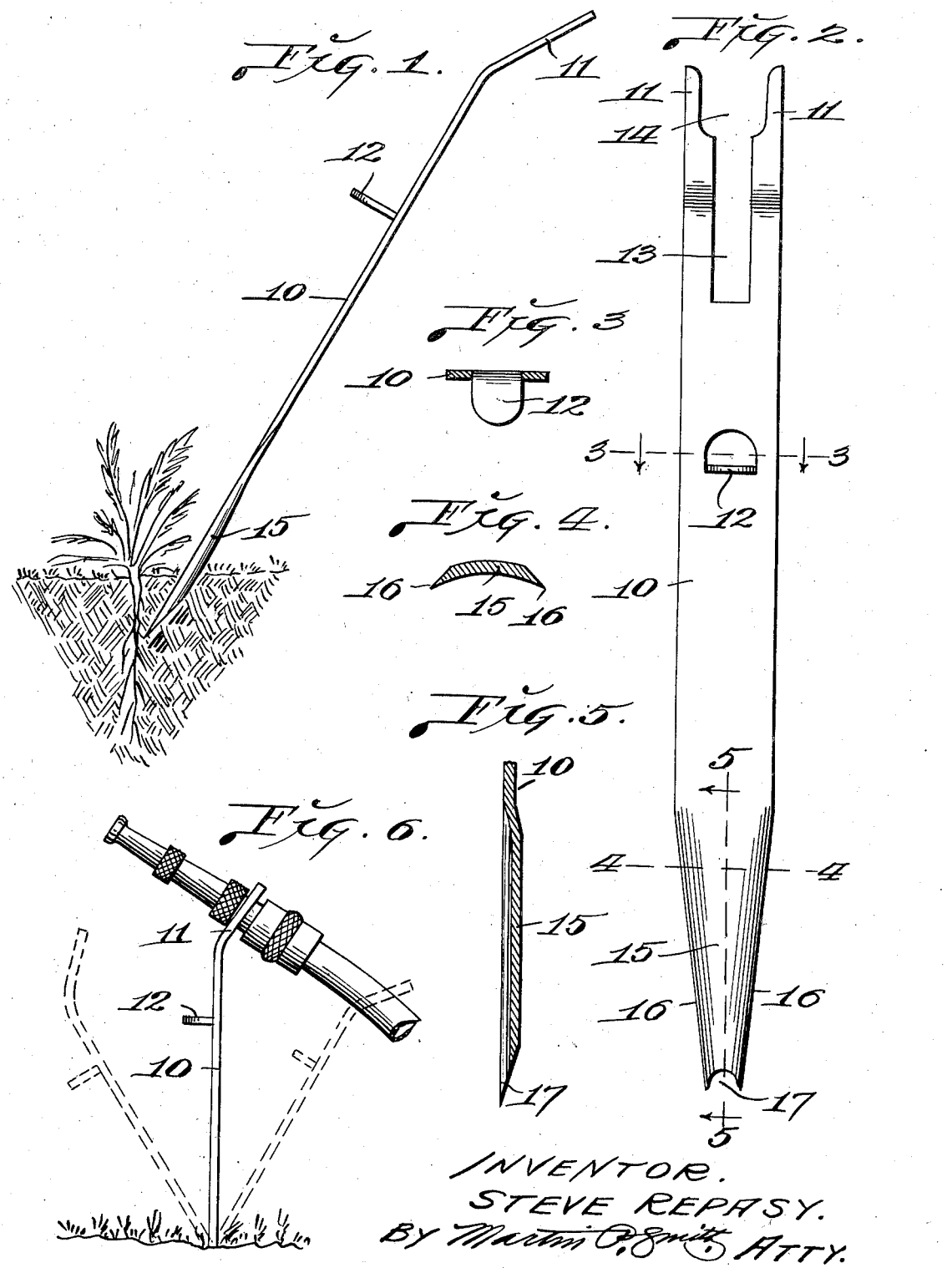
INVENTOR.
STEVE REPASY.
BY Martin P. Smith, ATTY.

Patented May 9, 1939

2,157,346

UNITED STATES PATENT OFFICE 2,157,346

LAWN AND GARDEN TOOL

Steve Repasy, Los Angeles, Calif.

Application March 29, 1938, Serial No. 198,662

1 Claim. (Cl. 55—65)

My invention relates to a lawn and garden tool, and has for its principal object to provide a relatively simple and inexpensive tool that is formed from a single piece of metal, and which is constructed so as to be used as a weed cutter and as a support for hose nozzles that are used in sprinkling water on the lawn or garden.

A further object of my invention is to provide a tool of the character referred to that may be conveniently utilized for cutting the roots of weeds and which tool, during the weed-cutting operation, does not materially disturb the earth, nor does it lift or dig up any dirt or foliage so that after using the tool the ground or lawn maintains its smooth unbroken appearance.

A further object of my invention is to construct the upper portion of the tool so that it will conveniently fit in the hand during use, and the tool being provided with a projection against which the thumb of the user may be so as to apply downward pressure to the tool when it is forced into the ground to cut the roots of a weed.

A further object of my invention is to provide a lawn and garden tool that will serve as a convenient and sufficient support for the nozzles of hose that are utilized in sprinkling the lawn or garden.

With the foregoing and other objects in view my invention consists in certain features of construction and arrangements of parts that will be hereinafter more fully described and claimed and illustrated in the accompanying drawing in which:

Fig. 1 is a side elevational view of a combination lawn and garden tool constructed in accordance with my invention and showing the lower end thereof inserted in the ground as it appears during a root-cutting operation.

Fig. 2 is a front elevational view of the tool.

Fig. 3 is a cross-section taken on the line 3—3 of Fig. 2.

Fig. 4 is an enlarged cross-section taken on the line 4—4 of Fig. 2.

Fig. 5 is an enlarged vertical section taken on the line 5—5 of Fig. 2.

Fig. 6 is an elevational view showing the tool utilized as a post or standard for supporting the nozzle of a hose.

Referring by numerals to the accompanying drawing which illustrates a preferred embodiment of my invention, 10 designates the main body of the tool which is formed of metal, preferably steel, and which may be suitably plated to render it rust proof, and said body is approximately 6 or 7 inches in length and an inch in width. The upper portion 11 of the body is bent so as to occupy a plane of approximately 30 or 35 degrees with respect to the plane occupied by the body 10, in order that the tool will fit conveniently in the hand while being forced into the ground, and in order to provide a bearing for the end of the thumb of the hand utilized in forcing the tool into the ground, a portion near the center of the tool is cut and stamped forwardly to form an ear 12.

The upper portion of the body 10 is provided with a longitudinally disposed slot 13 that extends partially through the bent upper portion 11 and at the upper end of the tool this slot is widened, as designated by 14, in order to form a notch for the accommodation of a hose nozzle, thus holding the latter in position during lawn sprinkling operations.

The lower portion 15 of the body 10 gradually decreases in width toward its lower end, and said tapered portion is made slightly channel-shape in cross-section, and the side edges thereof are beveled on the rear side to form sharp cutting edges 16.

The extreme lower end of the tapered portion 15 is provided with a notch 17 that is preferably of inverted U-shape and the edge of this notch is sharpened to form a cutting edge.

When my improved tool is utilized for cutting the roots of weeds, the notched lower end of the tool is inserted in the ground immediately adjacent a weed and with the operator's hand grasping the upper end of the tool with the end of the thumb resting on ear 12, the tool is pressed downward, preferably on an inclined plane, so as to sever the root of the weed a short distance below the surface of the ground.

After withdrawing the sharp lower end of the tool from the ground, that portion of the weed above the ground and that portion of the root above the cut may be readily removed. The removal of the tool and the cut portion of the weed from the ground leaves practically no marks and there is no dirt or foliage turned or dug up during such removal.

Where the tool is used as a supporting standard or post for a hose nozzle, the tapered lowered portion of the tool is forced into the ground and that portion of the nozzle immediately to the rear of the adjustable forward member is engaged in the notch or opening 14 at the upper end of the tool, and thus said nozzle is firmly held in the desired position for sprinkling any predetermined portion of the lawn or garden.

Obviously the tool may be forced into the ground in different angular positions so as to hold the hose nozzle in differently adjusted positions, and the forward portion of the nozzle that is rotated to control the flow of water from the nozzle may be conveniently adjusted while the nozzle is supported by the standard.

Thus it will be seen that I have provided a simple and inexpensive one-piece tool that may be conveniently and effectively employed for cutting the roots of weeds on lawns and in the garden, and said tool also providing a convenient supporting standard for hose nozzles.

It will be understood that minor changes in the size, form and construction of the various parts of my improved lawn and garden tool may be made and substituted for those herein shown and described without departing from the spirit of my invention, the scope of which is set forth in the appended claim.

I claim as my invention:

As a new article of manufacture, a one piece lawn and garden tool comprising a strip of metal of uniform width throughout its length, the upper portion of which is bent rearwardly so as to fit conveniently in the hand of the user, said rearwardly bent upper portion being provided with a notch, a thumb-rest struck from the metal in the strip and bent forwardly from the intermediate portion of said strip, the lower portion of which strip gradually decreases in width toward its lower end, there being an inverted U-shaped notch formed at the lower end of the tapered portion of said strip and the side edges of the tapered portion of said strip and the edge of said inverted U-shaped notch being sharpened to form cutting edges and the tapered lower portion of said strip being channel-shape in cross-section.

STEVE REPASY.